US005334964A

United States Patent [19]

Voigt et al.

[11] Patent Number: 5,334,964

[45] Date of Patent: Aug. 2, 1994

[54] CURRENT LIMITING CHOKE COIL

[75] Inventors: Heinz Voigt, Frankfurt am Main; Roland Fischer, Nidderau; Rudolf Schneider, Frankfurt am Main, all of Fed. Rep. of Germany

[73] Assignee: Licentia Patent-Verwaltungs-GmbH, Frankfurt, Fed. Rep. of Germany

[21] Appl. No.: 690,948

[22] PCT Filed: Aug. 22, 1989

[86] PCT No.: PCT/EP89/00983

§ 371 Date: Apr. 29, 1991

§ 102(e) Date: Apr. 29, 1991

[87] PCT Pub. No.: WO90/02407

PCT Pub. Date: Mar. 8, 1990

[30] Foreign Application Priority Data

Aug. 29, 1988 [DE] Fed. Rep. of Germany ....... 3829207
Jun. 14, 1989 [DE] Fed. Rep. of Germany ....... 3919465

[51] Int. Cl.[5] ......................... H01F 1/00; H02H 7/00; H01H 47/00

[52] U.S. Cl. ............................. 505/211; 336/DIG. 1; 505/705; 505/850; 505/851; 505/880; 361/19; 361/141; 335/216

[58] Field of Search ............... 505/705, 850, 851, 880; 335/216; 361/19, 141; 336/DIG. 1

[56] References Cited

U.S. PATENT DOCUMENTS 2,946,030 7/1960 Slade .
3,091,702 5/1963 Slade .
3,094,628 6/1963 Jiu .
3,143,720 8/1964 Rogers .......................... 336/DIG. 1
4,894,360 1/1990 Leupold ................................. 505/1
4,988,669 1/1991 Dersch .
5,140,290 8/1992 Dersch ................................ 336/221

FOREIGN PATENT DOCUMENTS 0142506 7/1985 Japan ................................... 335/216
0241102 9/1989 Japan ................................... 335/216
0068905 3/1990 Japan ................................... 335/216

OTHER PUBLICATIONS

"Superconductivity: Fact vs. Fancy," *IEEE Spectrum*, 25 (1988) May, No. 5, New York, N.Y., USA, pp. 30–41.

Winterberg, "Magnetically Insulated Transformer for Attaining Ultrahigh Voltages," *The Review of Scientific Instruments*, Dec. 1970, vol. 41, No. 12, pp. 1756–1763.

*Primary Examiner*—Lincoln Donovan
*Assistant Examiner*—Stephen T. Ryan
*Attorney, Agent, or Firm*—Spencer, Frank & Schneider

[57] ABSTRACT

A device having cores of metal oxide ceramic (for example, Y-Ba-Cu-O) for limiting a short circuit current in power supply systems. The concept provides that a choke core, when operated at a rated current, is superconductive and its shielding currents keep the resulting inductance in the choke at a low level. In the event of an overload, the winding of the choke generates a correspondingly high magnetic field in the core which puts the core into the normally conducting state. This causes the shielding currents to disappear in connection with a rise in the resulting inductance, thus limiting the current. In order to realize a particularly high inductance in the normally conductive case, the superconductive choke core may be made hollow and may be filled at least in part with a ferromagnetic material.

21 Claims, 5 Drawing Sheets

CURRENT LIMITING CHOKE COIL

BACKGROUND OF THE INVENTION

1. Field of the Invention

The invention relates to a current limiting choke coil including a coil through which current flows and particularly to a current limiting choke coil with a metal oxide ceramic superconductive core.

Super conducting switching devices are known (U.S. Pat. No. 2,946,030). Such a prior art device includes, in addition to the winding penetrated by alternating currents, a control coil for direct currents having a switching element actuated by feeding current into the control coil. If the control coil does not carry any direct current, the switching element has a very low impedance so that a high current is able to flow in the alternating current circuit. By feeding an appropriate direct current into the control winding, the superconductivity of the core is removed so that the device has a high impedance which reduces the alternating current. Also known are metal oxide ceramic superconductors (IEEE Spectrum, Volume 25, No. 5, May, 1988; K. Fitzgerald, "Superconductivity: Fact vs. Fancy", pages 30–41.

BACKGROUND OF THE RELATED ART

Upon a malfunction, high power energy supply electrical systems are subjected to extremely high electrodynamic stresses as a result of short circuit currents. Although a circuit breaker associated with sections of a malfunctioning system can interrupt a short circuit current, full short circuit current will flow in each case. Hence, expanding electrical power generation and transmission involves increasing short circuit powers resulting in increased electromechanical forces in the operating media in the event of malfunctions. These increased electromechanical forces occur primarily at locations of high power concentration and at system coupling points. Often over-sized bus bars, switching devices and transformers are employed in order to accommodate a future increase in short circuit power. Existing system components that are too weak must possibly be reinforced in the course of system expansion or replaced by new devices. Costs of expanding the electrical power capability of the systems involving high power concentration can be reduced if the short circuit currents can be limited. In a three-phase system this is accomplished with simple air chokes as described in Techn. Mitt. AEG-TELEFUNKEN [Technical News from AEG-TELEFUNKEN]61 (1971), No. 1, pages 58–63. These chokes exhibit a current proportional voltage difference which, although they appear to be limited in the case of a short circuit, in many cases under normal load takes on values which are too high to maintain stability of system operation. More favorable than simple chokes are devices having a non-linear current-voltage characteristic. This includes a limiting coupler as described in ETZ-A 87 (1966), pages 681–685. This coupler operates as a series resonant circuit which is tuned to the system frequency and, in normal operation, constitutes a very small resistance. A non-linear resistance combination in parallel with the capacitance of the resonant circuit takes care that, upon a malfunction, the resonance condition is cancelled and the inductance limits the current. However, the limiting coupler, developed as a coupling between two high power systems, has not found acceptance as a short circuit current limiter, primarily because of the high cost of the capacitor battery in the resonant circuit.

The development of superconductors for use at high current densities and with large magnetic fields has led to numerous solutions and proposals for current limiting switching devices. The publication El. Rev. Int., Vol. 202 (1978) No. 5, pages 63–65, reports of a short circuit current limiter having three pairs of transductors whose iron cores are magnetically saturated in normal operation with the aid of a superconductive current loop in that they are flooded by a normally direct field and exhibit a low inductive resistance. However, in the case of a short circuit, the increased alternating current amplitude cancels out the direct current flowing in the individual transductors by half-waves so that each pair of transductors acts as a high inductance choke.

Other devices utilize the sudden rise in resistance during the transition from superconductive to normally conductive state. In the case of an overload, this transition is brought about by exceeding the critical current density and the critical magnetic field in the respective conductor arrangement.

In Adv. Cryogen. Engng., Vol. 13 (1968), pages 25–50, an arrangement is described which employs a metal conductor path that is cooled with liquid helium and is superconductive at a rated current. With the aid of a separately excited magnetic field winding, this conductor path is converted to a normally conductive state as soon as an unduly high current increase is detected in the protecting circuit. The high current cryotron according to German Patent No. 1,228,701 (1969) operates with a superconductive gate conductor configuration which loses its capability to become superconductive when a current threshold is exceeded and becomes an ohmic resistance due to the inherent magnetic field of the arrangement, which is possibly supported by extraneous fields. The arrangement for limiting excess current in electrical power supply systems disclosed in DE-A 2,712,990 (1977) operates with a superconductive cable section. In this cable, the normally conducting and the superconducting components are dimensioned, with respect to materials ann cross-section, so that, after the critical response current has been exceeded, a normally conductive current path suddenly results, that is, a current path exhibiting a resistance, which limits the current.

Such current limiters have not been employed in power supply systems, primarily because of the high cryogenic expenditures for circulating the helium required to operate metal superconductors at temperatures from 4 to 12K. Moreover, their specific resistance in the normally conductive state is very low at low temperatures.

This applies primarily for high current superconductors stabilized by copper or aluminum whose specific resistance at operating temperature lies in an order of magnitude of $10^{-8}$ Ohm cm. Thus, such switching devices require long conductor lengths so as to utilize the difference between the resistance in the superconductive state and in the normally conductive state.

SUMMARY OF THE INVENTION

It is an object of the invention to further develop a device of the above-mentioned type so that, with the simplest possible configuration and economical operation, it can be employed as a protection device in alternating current circuits.

This is accomplished according to the invention in that the portion of the core that is capable of superconductivity is composed of a metal oxide ceramic superconductor; the core has only one winding; the alternating current flowing in the winding at the system frequency; and the threshold of the magnetic field is generated n the winding by a threshold current. With this device it is possible to considerably reduce cryogenic expenditures and material costs.

Oxide ceramic superconductors have transition temperatures in a range of 90K and have a specific resistance which is several orders of magnitude higher once the superconductive state no longer exists, than the resistance of extensively cooled metal conductors. Due to the increase in the ohmic resistance of the core beginning at a given current threshold, the current is forced to flow through the high main inductance if the currents are small in the core.In this way, current generated, for example, by a short circuit in a power distribution system, is limited.

The current limiting choke as a whole, or at least its core, is cooled by liquid nitrogen. Cooling with liquid nitrogen is sufficient to keep the core at the temperature required for superconductivity.

In a suitable embodiment, the core has a toroidal shape around which the windings are placed in the form of an annular coil. This configuration involves low stray losses.

It is particularly favorable to configure the superconductive hollow body alternatingly of superconductive and ferromagnetic elements. inductance of the choke can be increased considerably in that the superconductive hollow body is filled completely or in part with a ferromagnetic material. It is also advisable to construct the choke core alternatingly of elements capable of superconductivity and of ferromagnetic elements.

The use of ferromagnetic material in conjunction with the superconductive core considerably augments the magnetic flux so that the current limiting effect of the choke in the case of a short circuit is improved. On the other hand, the dimensions of the choke coil can be reduced while retaining the inductance determined for a specific case.

Preferably, the susceptibility of the ferromagnetic material below the critical temperature of the superconductive material of the core and of the elements, respectively, has a high value which is typical for ferromagnetic substances. The core of the choke coil is cooled to such an extent that the oxide ceramic superconductor has a temperature which is lower than its transition temperature, for example 90 K. The ferromagnetic material must have a high susceptibility at a temperature which lies below the transition temperature.

In a suitable embodiment, the ferromagnetic material is thermally insulated from the superconductive core and the superconductive elements, respectively, so that it can be held at a temperature at which the susceptibility has a high value typical for ferromagnetic substances. In this embodiment, it is not necessary to employ a ferromagnetic material that retains a high susceptibility at low temperatures. In particular, the temperature can be regulated to a value which lies lower than room temperature and at which there still exists sufficiently high susceptibility.

In an advantageous embodiment, a ferromagnetic body is provided with a layer of a metal oxide ceramic superconductor. Such a core configuration is very simple. The ferromagnetic body must retain its susceptibility at low temperatures. If a ferromagnetic material is employed which does not have a high susceptibility at low temperatures, then preferably thermal insulating layer is provided on the ferromagnetic body, with a layer of a metal oxide ceramic superconductor being disposed on the insulating layer.

In a particularly favorable embodiment, the superconductive core and the superconductive elements are composed of individual juxtaposed segments of metal oxide ceramic material. With such a configuration it is possible to realize a large core structure.

BRIEF DESCRIPTION OF THE DRAWING

The invention will now be described in greater detail with reference to an embodiment thereof that is illustrated in the drawings, which will reveal further details, features and advantages.

It is shown in.

DETAILED DESCRIPTION OF THE PREFERRED EMBODIMENTS

Figure 1:
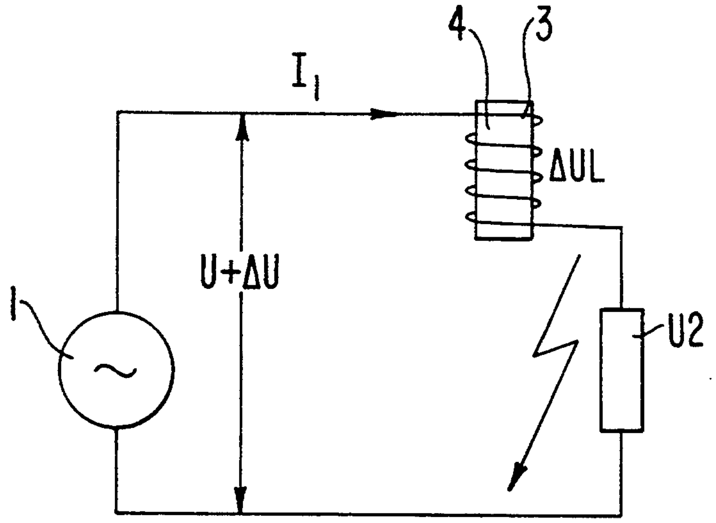
FIG. 1, an alternating current circuit including a short-circuit current sensor device.

In FIG. 1, the numeral 1 identifies an alternating current source (generator, transformer), the numeral 2 a load, 3 a current limiting choke coil including a superconductive core 4 and an inductance L. The core 4 is made superconductive by cooling it to below the transition temperature of the core material and serves to keep the inductance of choke 3, in view of the shielding currents in the core, at the low value $L=L_1$. A voltage drop of $\Delta U=I_1\psi L_1$ occurs across choke 3, with $I_1$ identifying the current flowing during operation, and $\psi$ the radian frequency of the system. The voltage across load 2 is here assumed to have the value U and the voltage of current source 1 has the value $U+\Delta U$. A short circuit, indicated by an arrow in FIG. 1, signifies that the impedance of the load and its operating voltage U go toward zero. Without special measures, the short circuit current flowing then would be $I_1 =(U+\Delta U)/(\psi L_1)$. This is prevented, according to the invention, in that, if there is an undesirable rise in current, the superconductivity in the core of choke coil 3 is cancelled out by the critical current density and the magnetic flux density being exceeded. Consequently, the shielding currents disappear and the magnetic flux is able to fully penetrate the interior of the choke coil, resulting in an increase in the inductance to the value $L_2>L_1$. Instead of a short circuit current, the current now flowing is $I_2=(U+\Delta U)/(\psi L_2)$. The impedances of the current source and of the lines are neglected in this consideration.

For explanation, a numerical example including the following data shall be considered: $U=63.6$ kV, $I_1=2$ kA, $\psi=314\ s^{-1}$, $L_3=3$ mH, $\Delta U=1.9$ kV. These numerical values result in a short circuit current $I_K=69.5$ kA$\approx 35\ I_1$.

Figure 2:
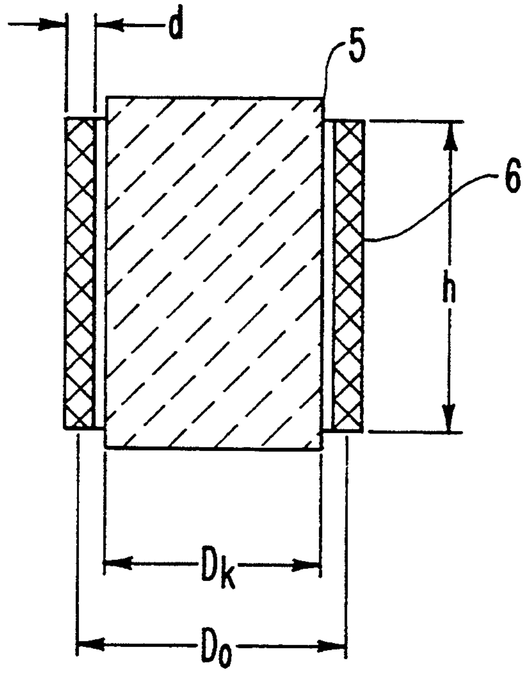
FIG. 2, a sectional view of a cylindrical choke coil according to the invention.

If in the case of a malfunction, the current is limited, for example, to $I_K/5\approx 14$ kA, the forces in the current carrying operating media drop to 1/25 of the forces due to the electrodynamic stress caused by the full short circuit current. In order to meet the condition of $I_2=I_K/5$, the current limiting inductance in the case of a malfunction would have to take on the value $$L_2=(U+\Delta U)/(\psi I_2) \quad (1)$$

that is, it would have to rise to 5 $L_1$. Inductance changes of this type can be realized with a cylindrical choke coil according to FIG. 2. In FIG. 2, the numeral 5 identifies a metal oxide ceramic core, particularly Y-Ba-Cu-O, which is capable of superconductivity and has a diameter $D_K$, the numeral 6 identifies a winding having an average winding diameter $D_0$, a wire thickness d, a height h and a number of windings w For $d<<D_0$, the inductance of the cylindrical coil alone is $L_0=D_0\cdot Q\ w^2/2$, where Q is a geometry factor listed in a table by Kohlrausch in Praktische Physik [Practical Physics ], Volume 2, (1944), page 204, as a function of $D_0/h$.

For a cylindrical winding with core, the following consideration applies: if the temperature of the core material falls below its transition temperature $T_c$, the core becomes superconductive and urges the magnetic flux into the annular chamber between core and winding. In order to approximately calculate the resulting inductance in this state, the core can be replaced by a concentric second cylindrical winding of the same height having a diameter $D_K$ and being wound in the opposite direction. The inductance of this equivalent circuit is:

$$L_1=(D_0\cdot Q\cdot(D_0/h)-D_K\cdot Q\cdot(D_K/h))\ w^2/2 \quad (2)$$

Figure 3A:
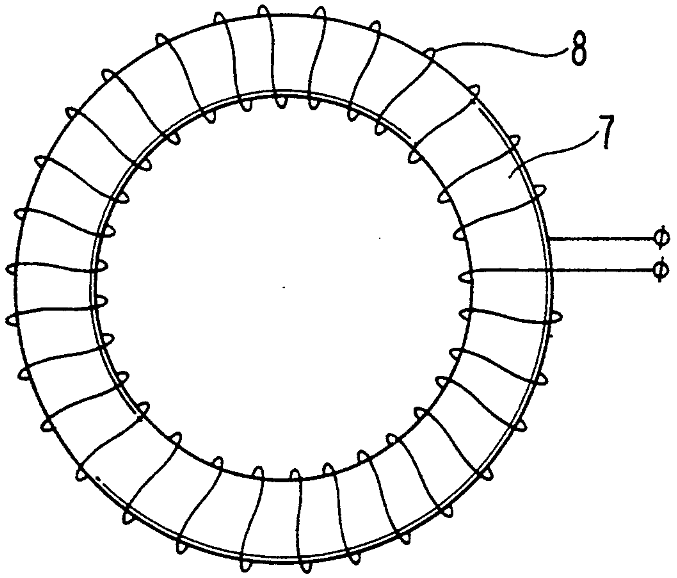
FIG. 3A, a top view of a choke coil having a toroidal core and an annular winding.
Figure 3B:
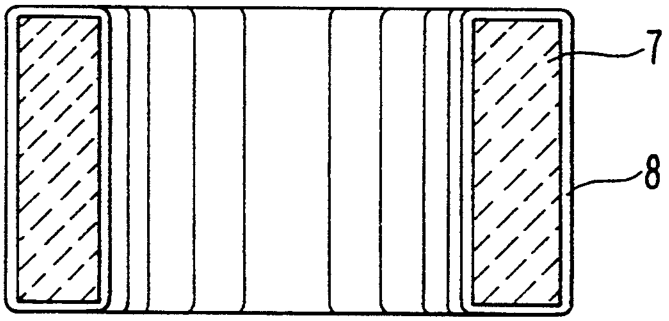
FIG. 3B, a cross sectional view of the toroidal core of FIG. 3A.

If the superconductivity in the core is cancelled out because the critical current density and the magnetic flux density are exceeded, the inductance rises to the value $L_0=L_2$ and limits the current to the amount $(U+\Delta U)/(\psi L_2)$. This simple relationship applies if the specific resistance of the core material is so high that eddy currents induced in the core without superconductivity have practically no influence on the inductance. The above current limiting concept can be transferred, in principle, to windings and cores having different geometries, thus also to the toroidal arrangements of FIGS. 3A and 3B which operate without interfering stray magnetic fields. In FIGS. 3A and 3B, the numeral 7 identifies the toroidal core on a superconductive ceramic and the numeral 8 the annular winding surrounding it.

Figure 4:
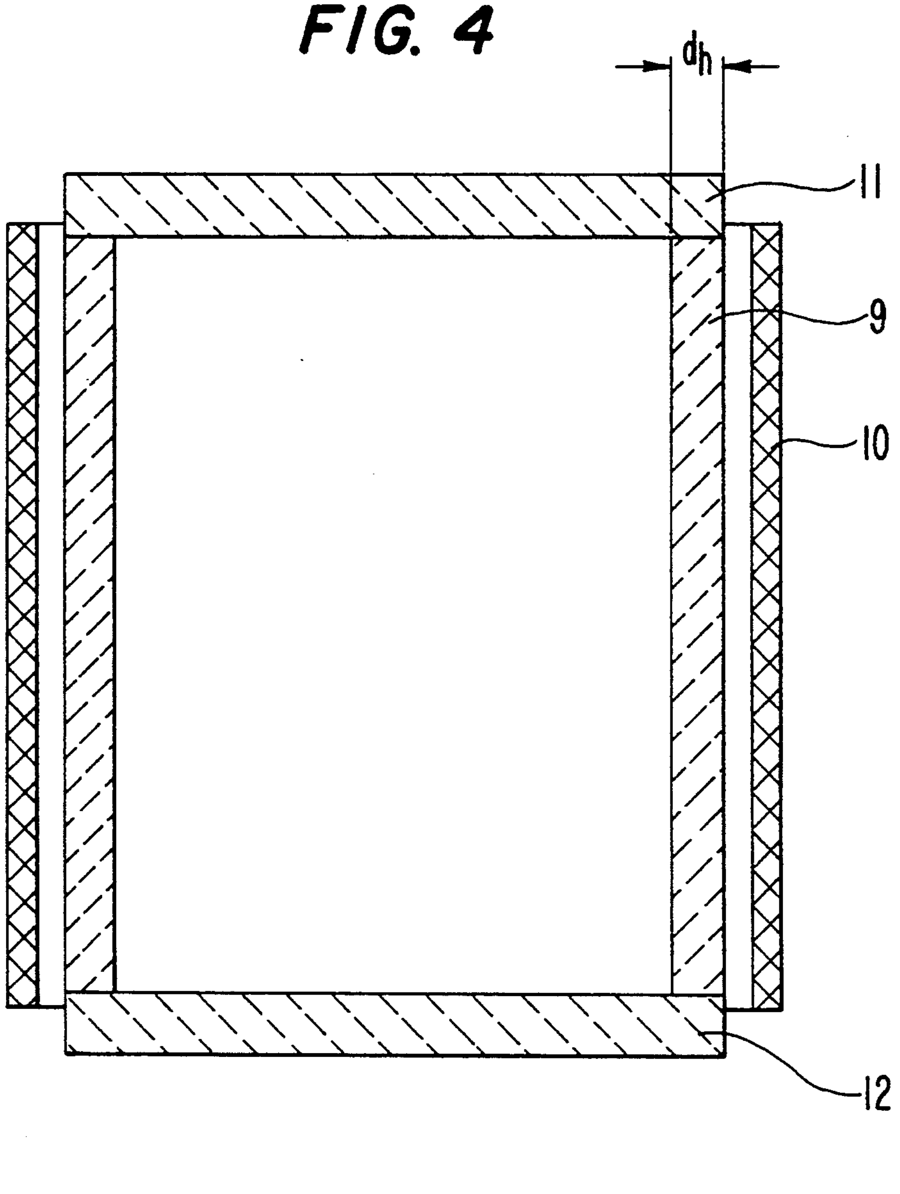
FIG. 4, a special version of a choke core that is able to become superconductive in the form of a hollow cylinder having end pieces at its frontal faces.

Another version of the core is shown in FIG. 4 for the example of a cylindrical choke coil. The core 9 is configured as a hollow cylinder having a wall thickness $d_h$ and is arranged concentric with winding 10.

End pieces 11 and 12 close off the frontal faces of the hollow cylinder. They have the effect that in the superconductive state, the magnetic flux of the coil does not penetrate into the interior of the cylinder and thus produces a shielding comparable to that obtained with a solid cylindrical core.

Figure 5:
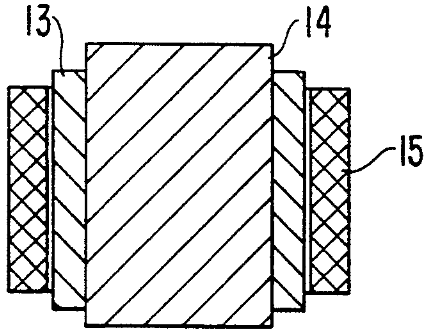
FIG. 5, a special version of the superconductive choke core in the form of a hollow cylinder containing ferromagnetic material.

In FIG. 5 the superconductive core 13 is configured as a closed hollow cylinder in which a ferromagnetic material 14 is disposed. Core 13 is surrounded by a winding 15.

The ferromagnetic material must retain its susceptibility at low temperatures. A ferromagnetic material is employed which at higher temperatures, for example at room temperature, has a high susceptibility which remains in effect in a range of 90K.

Figure 6:
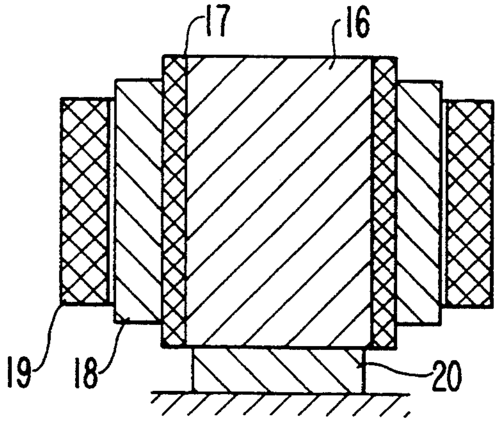
FIG. 6, a choke core with a thermally insulating layer 17.

In the embodiment shown in FIG. 6, a cylindrical body 16 of ferromagnetic material is surrounded by a layer 17 of thermal insulating material. Layer 17 is in turn surrounded by a hollow cylindrical superconductive core 18 which has a cylindrical winding 19 arranged on its exterior face. Layer 17 insulates body 16 from core 18. Moreover, body 16 is connected, for example by way of a base 20, with other components whose temperature is higher than the transition temperature of core 18. Therefore body 16 has a higher temperature than core 18 and may be composed of ferromagnetic material which at low temperatures in the range of the transition temperatures of core 18 loses its high susceptibility typical for ferromagnetic substances.

In order to produce a flat magnetization characteristic, ferromagnetic bodies 14 and 16 may also be configured as a closed circle alternatingly comprising sections of material capable of superconductivity and of ferromagnetic material. The hollow cylindrical configuration may then be omitted.

Or, the superconductive core may be applied as a layer to a ferromagnetic, for example, cylindrical or toroidal body. If the body retains its high susceptibility even at low temperatures, core and body may be connected directly with one another. Such an arrangement has the advantage that the core and the body can be cooled together. Often this simplifies the structural arrangement for the cooling. This applies to devices in which the ferromagnetic material retains its susceptibility in the range of the transition temperature of the core. If the susceptibility drops to undesirably low values in the range of the transition temperature, then a thermal insulating layer must be provided between the ferromagnetic body and the core, onto which the core, in particular, can be applied as a layer.

If the temperature of the core material falls below its transition temperature $T_c$, the core becomes superconductive and urges the magnetic flux into the annular space between core and winding. The choke coil therefore has a low inductance.

If the superconductivity in the core is cancelled out by the critical current density and the magnetic flux density being exceeded, the inductance increases considerably. At the system frequency, the above-described choke coil may have a low impedance compared to the load impedance.

The choke impedance $\psi L_1$ at rated current $I_1$, for example, has the following relationship to the load impedance Z:

$$\psi L_1=p\cdot Z \quad (3)$$

where p may equal 0.01. In the case of a short circuit, there remains the residual impedance:

$$Z_K = q \cdot Z \quad (4)$$

In the current limitation considerations below, a calculation with complex resistances is omitted for the sake of simplicity since p as well as $q << 1$.

Under the mentioned conditions, the following applies for the rated current if the choke core is superconductive $$I_1 = U/(Z + \psi L_1) = U/(1+p)Z \quad (t)$$

If current I rises, the superconductivity in the ceramic core is lost starting at a certain threshold. With increasing magnetic field, an almost steady increase of normally conductive regions is observed in the volume of an oxidic superconductor having a high transition temperature. Consequently, the inductance is a function of the current I. For the further considerations below, it is approximated in the following form:

$$L/L_1 = a(I/I_1 - 1) + 1 \quad (6)$$

where the coefficient marked a must be determined from measurements. Using the abbreviation $x = I/I_1$, the following relationship can be derived:

$$I(p(a(x-1)+1)+q) = U/Z = I_1(1+p) \quad (7)$$

where U identifies the system voltage.

This leads to the following equation:

$$x^2 + ((p - pa + q)/(pa))x - (1+p)/(pa) = 0 \quad (8)$$

from which the relationship between short circuit current and rated current can be calculated if a, p and q are known.

EXAMPLE

Figure 7:
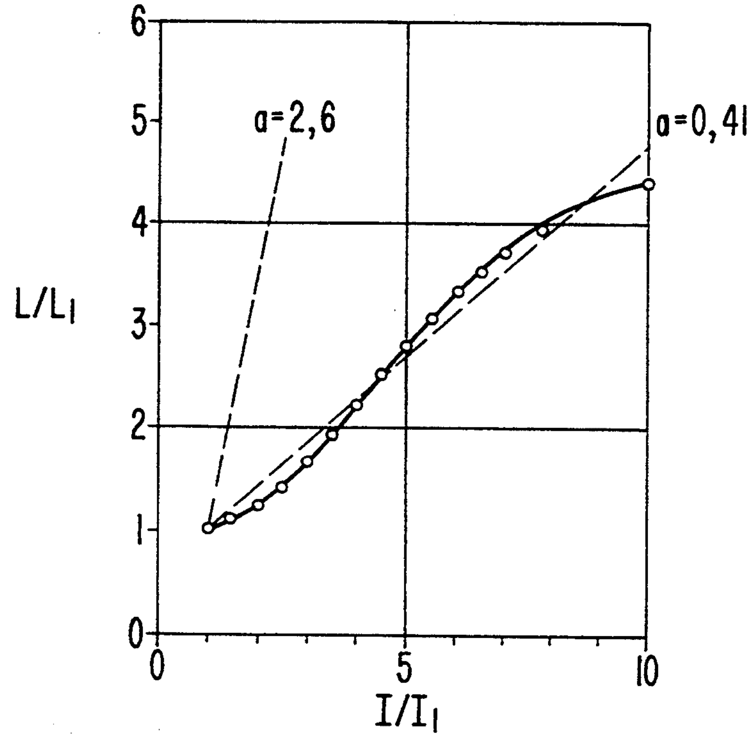
FIG. 7, a diagram of the dependency of the quotient of the inductance of the choke coil and the inductance at rated current upon the quotient of the current through the choke coil and the rated current.

FIG. 7 shows the evaluation of an experiment for the determination of the coefficient a. Measured was the increase in the inductance of a choke coil in a magnetic field. The superconductive core was a hollow ceramic cylinder having an exterior diameter of 20 mm, an interior diameter of 16 mm and a height of 30 nun. The winding had 80 turns, a length of 26 mm, an average diameter of 21 mm. With the core superconductive, the inductance was $L_1 = \mu H$, with a completely normally conductive core, it was $L_0 = 83\ \mu H$, measured at a frequency of 10 kHz. For $L/L_1$ as a function of $I/I_1$, an S-shaped curve resulted which had an average slope $a = 0.41$.

The effect of an analog choke as a current limiter will now be discussed with reference to an example. For the system parameters according to Equations (3) and (4) the following numerical values are assumed to exist: $p = 0.01$ and $q = 0.03$.

With $a = 0.41$ (according to FIG. 7), Equation (8) furnishes the current ratio $x = 11.9$. In the case of a short circuit, the current under these conditions would be limited to roughly twelve times the value of the rated current. The unlimited short circuit current, calculated for the same parameters, would reach 25 times the rated current.

A farther reaching limitation of the short circuit current can be realized with an L(I) choke coil characteristic that is steeper than shown in FIG. 7. With a slope of $a = 2.6$, also shown in FIG. 7, and again with $p = 0.01$ and $q = 0.03$, the short circuit current could be limited to six times the rated current.

Figure 8:
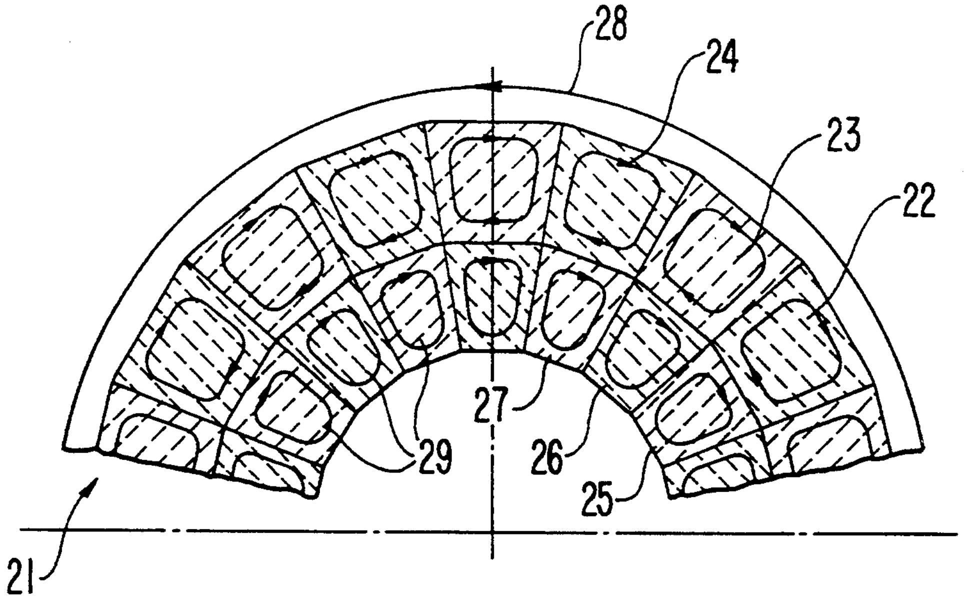
FIG. 8, a cross-sectional view of an additional embodiment of a choke coil.

With large core dimensions which cannot be produced by conventional manufacturing methods for high transition temperature superconductors, the superconductive cores are subdivided as shown in FIG. 8 for part of a core 21. Core 21 is composed of individual superconductor segments of which FIG. 8 identifies superconductor segments 22, 23, 24, 25, 26 and 27. Superconductor segments 22, 23 and 24 are disposed in a radially outward position on core 21 while superconductor segments 25, 26 and 27 take up a radially inward position. More than the two layers shown in FIG. 6 may also be provided. Core 21 therefore has a polygonal cross section. Superconductor segments 22 to 27 form parts of the polygon. Core 21 is surrounded by a winding 28. A shielding current generally marked 29 flows in each one of superconductor segments 22 to 27 of the core and displaces the magnetic flux as a whole from the core region in the same manner as a corresponding ring current flows along the periphery. The thickness of the "grooves" between the core portions is here selected to be small compared to the core diameter.

The choke coil according to FIG. 8 may advisably have a cavity of ferromagnetic material. However, it also operates without ferromagnetic material, for example, as a solid core. It may be designed for high rated currents.

Figure 9:
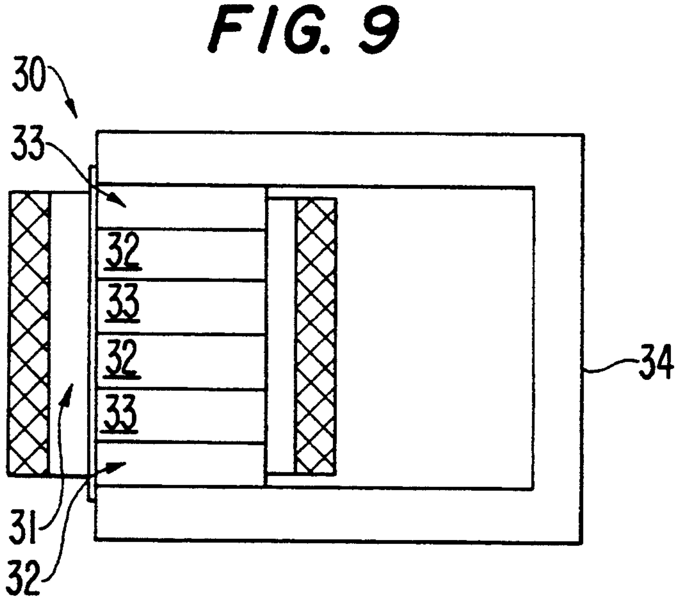
FIG. 9, a sectional view of a choke coil composed of alternating elements of superconductive and of ferromagnetic material.

FIG. 9 shows a choke coil 30 including a core 31 composed of alternating elements 32 and 33 of superconductive and ferromagnetic material. It is here assumed that the ferromagnetic material has a sufficiently high susceptibility even below the transition temperature of superconductive elements 32. Should this not be the case, a thermal insulation must be provided between elements 32 and 33.

Choke coil 30 has a yoke 34 of ferromagnetic material.

With respect to dimensioning and engineering development of a current limiting choke according to the invention, it may be advisable to operate the core material shortly below its transition temperature so as to keep the requirement for magnetization low for a transition from superconductivity to normal conductivity.

As soon as the limit current has cancelled out the superconductivity in the core, induction within the core temporarily produces heat, with the power density being a function of the specific resistance of the normally conducting core material and of the current in the choke. The thermal inertia of the core prevents it from dropping back into the superconductive state before the power switch associated with the malfunctioning system section has opened the short circuited connection. The time required to do this customarily is 1 to 2 periods of the system frequency.

Advisably the choke is cooled as a whole. Doing this, a very close magnetic coupling is possible between core and winding without cryogenic separation as it would be required only if the core were cooled. On the other hand, the ohmic losses in the winding are low since, at the liquid nitrogen temperature, the specific resistance of the conductor material of the winding drops to roughly 1/10 of its value at room temperature.

We claim:

1. A device comprising;

a single winding; and a coil core arranged in said single winding, said coil core comprising superconductive components of metal oxide ceramic superconductive material and ferromagnetic components of ferromagnetic material, wherein if the amplitude of an alternating current applied to said single winding exceeds a threshold value at a system frequency, said single winding generates a threshold magnetic field which converts said superconductive components into non-superconductive components.

2. A device according to claim 1, further comprising: cooling means for cooling at least said coil core with liquid nitrogen.

3. A device according to claim 1, wherein said coil core has a toroidal shape and said single winding has an annular shape.

4. A device according to claim 1, wherein said coil core is hollow and is composed alternatingly of elements capable of superconductivity and of ferromagnetic elements.

5. A device according to claim 4 wherein at temperatures below the critical temperature of the superconductive elements, the susceptibility of said ferromagnetic elements is typical of the susceptibility of ferromagnetic substances at room temperatures.

6. A device according to claim 4, wherein said ferromagnetic elements are thermally insulated from said superconductive elements and are held at a higher temperature than the temperature of said superconductive elements.

7. A device according to claim 1, wherein said superconductive elements are composed of individual superconductive segments which border on one another.

8. A device according to claim 7, wherein the superconductive components and the ferromagnetic components are alternately arranged.

9. A device comprising:
a single winding; and
a core arranged in said single winding, said core formed from a metal oxide ceramic superconductive component, wherein if the amplitude of an alternating current applied to said single winding exceeds a threshold value at a system frequency, said single winding generates a threshold magnetic field which converts said superconductive component into a non-superconductive component.

10. A device according to claim 9, further comprising cooling means for cooling at least said core with liquid nitrogen.

11. A device according to claim 9, wherein the core is configured as a solid cylinder 12. A device according to claim 9, wherein the core is configured as a toroid.

13. A device for changing an inductance of a choke comprising;
a single winding; and
a core arranged in the single winding for producing a first choke inductance when an alternating current applied to the single winding is less than a threshold at a predetermined frequency, and for producing a second choke inductance when the amplitude of an alternating current exceeds the threshold, the core formed from a metal oxide ceramic superconductor material so that a magnetic field produced by the current converts the superconductive material into a normally conductive material when the amplitude of the current exceeds the threshold.

14. The device for changing an inductance of a choke according to claim 13 further comprising a cooling device for cooling the core with liquid nitrogen.

15. The device for changing an inductance of a choke according to claim 13 wherein the core is further formed from alternating elements of the superconductive material and a ferromagnetic material.

16. The device for changing an inductance of a choke according to claim 15, further comprising a thermal insulator between the superconductive elements and the ferromagnetic elements.

17. The device for changing an inductance of a choke according to claim 13, wherein the core is formed from a plurality of segments of the superconductive material.

18. The device for changing an inductance of a choke according to claim 13, wherein the core is configured as a solid cylinder.

19. A device comprising;
a winding; and
a coil core arranged in the winding, the coil core being hollow and comprising alternatingly arranged superconductive components of metal oxide ceramic superconductive material and ferromagnetic components of ferromagnetic material, at temperatures below the critical temperature of the superconductive elements, the susceptibility of the ferromagnetic elements being typical of the susceptibility of ferromagnetic substances at room temperatures, wherein if the amplitude of an alternating current applied to the winding exceeds a threshold value at a system frequency, the winding generates a threshold magnetic field which converts the superconductive components into non-superconductive components.

20. A device comprising:
a winding; and
a coil core arranged in the winding, the coil core being hollow and comprising alternatingly arranged superconductive components of metal oxide ceramic superconductive material and ferromagnetic components of ferromagnetic material, the ferromagnetic elements being thermally insulated form the superconductive elements and held at a higher temperature than the temperature of the superconductive elements, at temperatures below the critical temperature of the superconductive elements, the susceptibility of the ferromagnetic elements being typical of the susceptibility of ferromagnetic substances at room temperatures, and wherein if the amplitude of an alternating current applied to the winding exceeds a threshold value at a system frequency, the winding generates a threshold magnetic field which converts the superconductive components into non-superconductive components.

21. A device for changing an inductance of a choke comprising:
a winding; and
a core arranged in the winding for producing a first choke inductance when an alternating current applied to the winding is less than a threshold at a predetermined frequency, and for producing a second choke inductance when the amplitude of an alternating current exceeds the threshold,
the core formed from alternating elements of a metal oxide ceramic superconductor material and a ferromagnetic material with a thermal insulator between the superconductive elements and the ferromagnetic elements, a magnetic field produced by the current converts the superconductive material into a normally conductive material when the amplitude of the current exceeds the threshold.

* * * * *